(12) United States Patent
De Anna et al.

(10) Patent No.: US 7,994,727 B2
(45) Date of Patent: Aug. 9, 2011

(54) LED DRIVING ARRANGEMENT

(75) Inventors: Paolo De Anna, Vallà di Riese Pio X (IT); Alberto Ferro, Preganziol (IT); Nicola Zanforlin, Campodarsego (IT)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 161 days.

(21) Appl. No.: 12/085,314

(22) PCT Filed: Nov. 16, 2006

(86) PCT No.: PCT/EP2006/068548
§ 371 (c)(1),
(2), (4) Date: Oct. 30, 2008

(87) PCT Pub. No.: WO2007/060128
PCT Pub. Date: May 31, 2007

(65) Prior Publication Data
US 2009/0273301 A1 Nov. 5, 2009

(30) Foreign Application Priority Data

Nov. 22, 2005 (EP) .................................... 05425827

(51) Int. Cl.
*H05B 37/02* (2006.01)
(52) U.S. Cl. ................... 315/209 R; 315/224
(58) Field of Classification Search .............. 315/244, 315/224, 307, 209 R
See application file for complete search history.

(56) References Cited

U.S. PATENT DOCUMENTS

| | | | |
|---|---|---|---|
| 5,495,404 A * | 2/1996 | Stephens | 363/132 |
| 5,736,881 A | 4/1998 | Ortiz | |
| 5,812,012 A | 9/1998 | Jebens | |
| 6,144,169 A * | 11/2000 | Janczak | 315/224 |
| 6,407,515 B1 * | 6/2002 | Hesler et al. | 315/294 |
| 6,577,512 B2 * | 6/2003 | Tripathi et al. | 363/21.17 |
| 6,680,585 B2 * | 1/2004 | Trestman | 315/291 |
| 6,804,129 B2 * | 10/2004 | Lin | 363/98 |
| 7,573,729 B2 * | 8/2009 | Elferich et al. | 363/21.02 |

FOREIGN PATENT DOCUMENTS

| | | |
|---|---|---|
| JP | 2001351789 A | 12/2001 |
| WO | 2005/048658 A1 | 5/2005 |

OTHER PUBLICATIONS

English language abstract of JP 2001-351789 A.
Kuwabara et al., "On the output voltage increase of a series resonant DC-DC converter", IEICE Technical Report. EE, Energy Engineering in Electronics and Communications, Japan, The Institute of Electronics, Information and Communication Engineers, May 6, 2005; vol. 105, No. 45, p. 35.
English translation of the Japanese Notification of Reasons for Refusal dated Mar. 3, 2011.

* cited by examiner

*Primary Examiner* — Douglas W Owens
*Assistant Examiner* — Minh D A

(57) ABSTRACT

A circuit for driving LEDs includes: —a transformer with a secondary winding for driving the LEDs and a primary winding, —a half-bridge arrangement fed with an input voltage and coupled to the transformer, —a resonant circuit between the half-bridge arrangement and the primary winding of the transformer, the resonant circuit having a given resonance frequency, and—a controller configured for switching the half-bridge arrangement with a switching frequency variable between first and second values. The second value is closer than the first value to the resonance frequency of the resonant circuit created between the half-bridge arrangement and the primary winding of the transformer. This boosts the voltage fed towards the LEDs via the transformer. The LEDs are preferably included in the form of series of LEDs connected to the secondary winding of the transformer via a rectifier placed outside the housing of the power-supply.

19 Claims, 3 Drawing Sheets

US 7,994,727 B2

LED DRIVING ARRANGEMENT

FIELD OF THE INVENTION

The present invention relates to driving arrangements for light emitting diodes (LEDs).

The invention was developed with specific attention paid to its possible use in driving LEDs used as lighting sources (so-called high-flux LEDs), where a good power factor is a basic requirement to be complied with.

DESCRIPTION OF THE RELATED ART

A good candidate circuit arrangement for driving LEDs is the so-called half-bridge (HB) resonant topology. In such an arrangement, one or more LEDs are driven via the secondary winding of a transformer. The primary winding of the transformer is part of a resonant circuit and is fed via a half-bridge arrangement driven in by a half-bridge controller. The voltage fed to the resonant circuit is thus essentially a square wave having a frequency in the range of 20-200 kHz whose envelope is modulated by the 50-60 Hz sine waveform of the mains voltage.

A basic drawback of such an arrangement lies in that energy transfer cannot take place when the input voltage to the half-bridge is lower than the LED threshold voltage multiplied by the transformer turn ratio (primary turns/secondary turns). This leads to rather long zero current periods on the mains and, consequently, to a bad power factor.

This problem could be notionally solved by decreasing the transformer turn ratio (primary turns/secondary turns). However, this would lead to an undesirable adaptation mismatch with the LED or LEDs being driven and a similarly undesired strong current increase on the primary side.

In this latter respect, it is worth mentioning that the LED driving arrangements being considered are generally expected to be included in compact, expectedly cheap, low-power drivers that must also comply with rather strict regulations in terms of safety and electromagnetic interference (EMI).

OBJECT AND SUMMARY OF THE INVENTION

The object of the present invention is thus to provide an effective solution to the problems described in the foregoing in connection with the half-bridge topology.

According to the present invention, that object is achieved by means of the arrangement having the features set forth in the claims that follow. The claims are an integral part of the disclosure of the invention provided herein.

BRIEF DESCRIPTION OF THE ANNEXED REPRESENTATIONS

Figure 1:
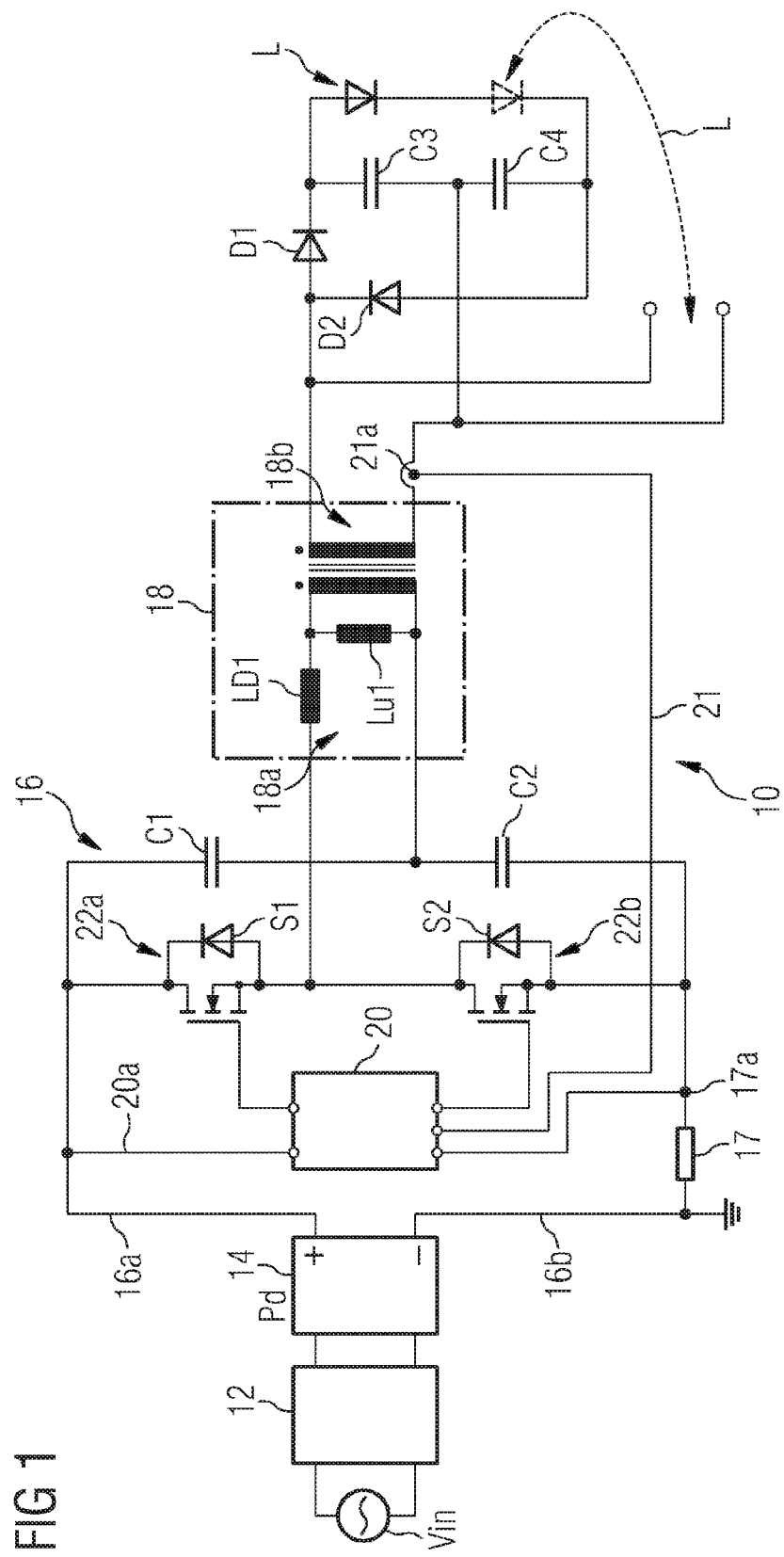
Figure 2:
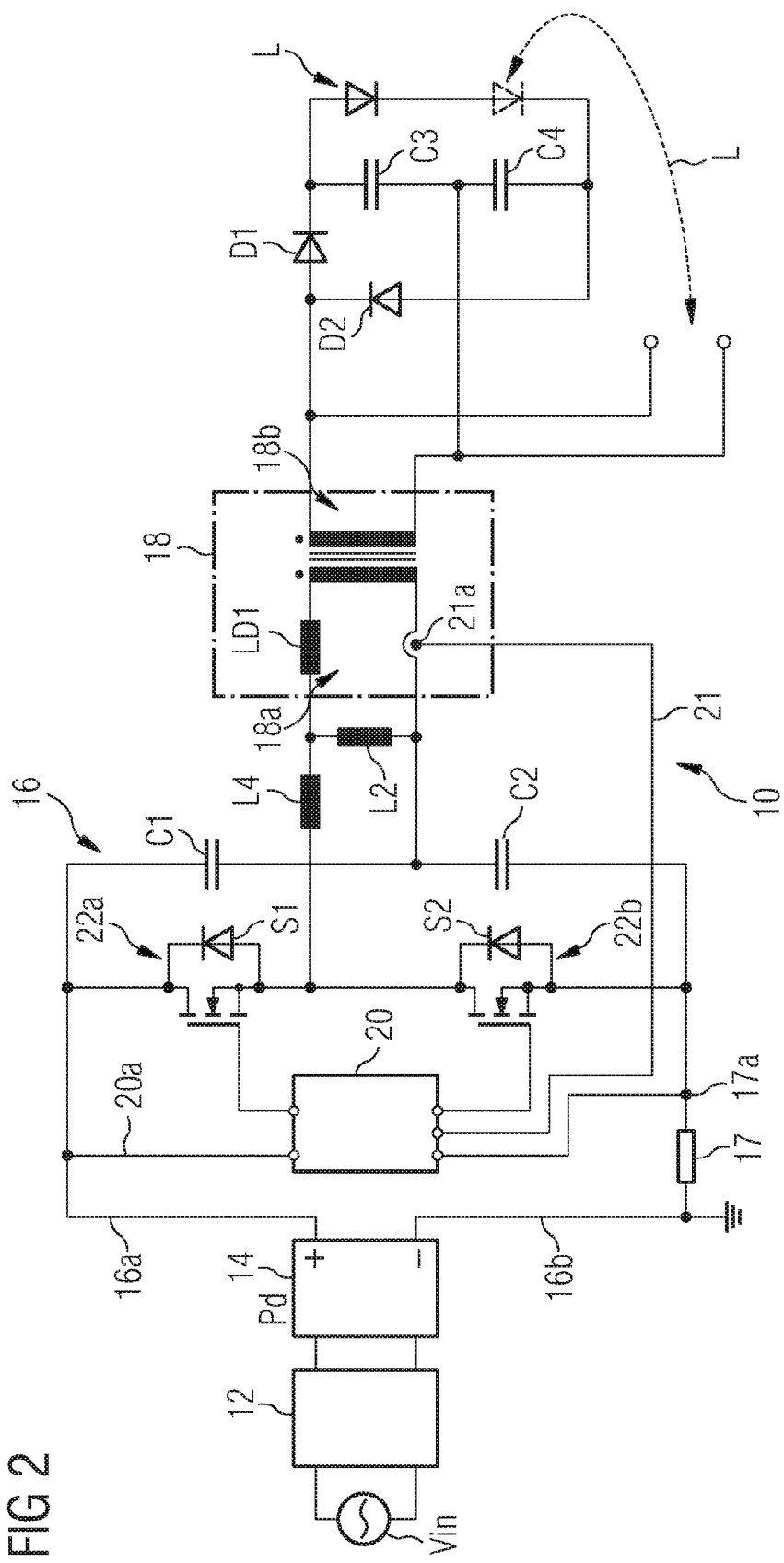
Figure 3:
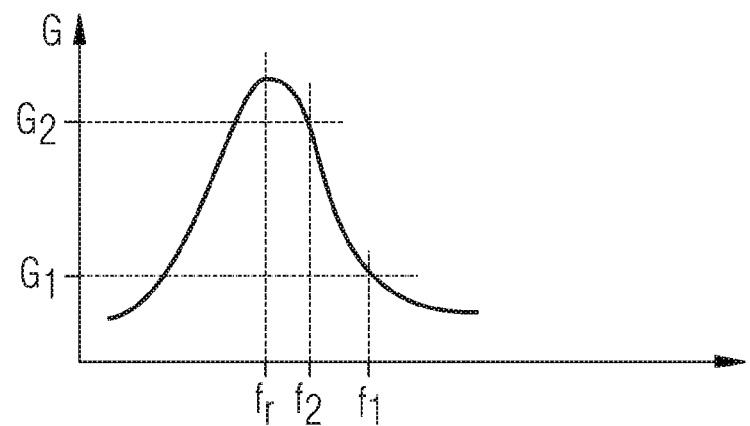
Figure 4:
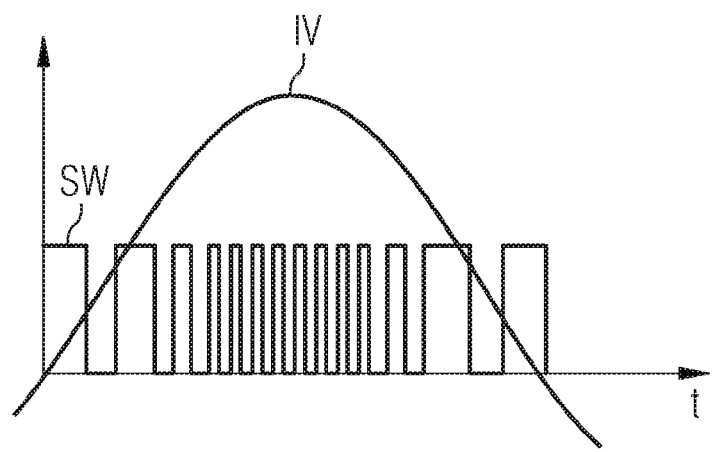

The invention will now be described, by way of example only, by referring to the enclosed representations, wherein:

FIG. 1 is a block diagram of first embodiment of the arrangement described herein, FIG. 2 is a block diagram illustrating an alternative embodiment of the arrangement described herein, and FIGS. 3 and 4 are diagrams representative of operation of the circuits of FIGS. 1 and 2.

DETAILED DESCRIPTION OF PREFERRED EMBODIMENTS OF THE INVENTION

As a first step, a general description will be provided of the circuit arrangements illustrated in FIGS. 1 and 2.

Both figures show a circuit arrangement (generally indicated as 10) for use as drive circuit for one or more LEDs L. In both figures only one LED L is shown with the proviso that the arrangement described can be used for driving one or more additional LEDs, connected in series in each rectifier and/or connecting the rectifiers in parallel, as schematically indicated in both figures.

In a manner known per se, the or each series of LED L is driven via a "voltage doubler" arrangement including a pair of diodes D1, D2 and a pair of capacitors C3, C4. These diodes act as rectifiers in order to ensure that the LED o LEDs in question are traversed by electrical current in the direction where the LED acts as a light source. Alternatively, the or each series of LED L could be driven via a full bridge rectifier.

The circuit 10 is connected in use to an ac mains source Vin (typically a 200-240V or 100-120 50-60 Hz mains source).

The overall arrangement of the device 10 includes, starting from the mains source Vin and proceeding "downstream" towards the LED or LEDs L:

a line filter 12 to filter out undesired high-frequency noise components from the power feed, a bridge rectifier 14 that feeds a half-bridge rectifier 16, and a transformer 18 having a primary winding 18a fed by the half-bridge and a secondary winding 18b that in turn feeds the LED or LEDs L.

The bridge rectifier 14 supplies the half-bridge arrangement 16 essentially as voltage signals over a first line 16a referred to a second line 16b. A resistor 17 is arranged over the second line 16b between ground and a point 17a. At the point 17a a voltage develops and can be sensed as a measure of the intensity of the current fed to the half-bridge 16.

The "current intensity" signal at point 17a is fed to a controller circuit 20. The control circuit or controller 20 equally senses (via a line 20a) the mains voltage signal over the line 16a as well a LED current feedback signal. This LED current feedback signal is provided over a line 21 as better detailed in the following.

The controller 20 controls two electronic switches 22a, 22b, typically in the form of MOSFETs S1, S2.

Unless otherwise specified in the following, the general circuit layout described so far corresponds to a general arrangement known in the art, thus making it unnecessary to provide herein a more detailed description of the structure and operation thereof. This applies a i.e. to the capability, for the controller 20, to selectively adapt to different operating conditions the drive signal applied to the electronic switches 22a, 22b.

This is achieved primarily by varying the frequency of the square wave driving signal applied to the control gates of the electronic switches 22a, 22b as a function of the signals sensed at 17a and via the lines 20a and 22 in order to stabilise the operating conditions of the LED or LEDs L.

The electronic switches 22a, 22b driven by the controller 20 are arranged over two arms of the half-bridge arrangement 16 connecting the two lines 16a and 16b to one of the ports or terminals of the primary winding 18a of the transformer 18.

Two capacitors C1, C2 are similarly arranged on the two other arms of the half-bridge arrangement 16, namely the two arms connecting the lines 16a, 16b with the other port of terminal of the primary winding 18a of the transformer 18.

In the arrangement illustrated in FIG. 1, the capacitors C1 and C2 form a parallel resonant circuit together with the magnetising inductance Lu1 of the transformer 18. The magnetising inductance Lu1 of the transformer can be modelled as an inductor connected in parallel with the primary winding 18a of the transformer 18.

The resonant circuit in question include also an inductor LD1 series-connected with the primary winding 18a, representing the leakage inductance of the transformer.

Whatever the specific arrangement adopted, typical values of the resonance frequency in question lie below the switching frequency.

The basic principle underlying operation of the arrangement illustrated in FIG. 1 provides for the resonant circuit in question to boost the voltage across the LED or LEDs around the zero-crossing instants of the voltage from the mains. Such a voltage boosting effect ensures that energy transfer takes place even when the input voltage of the half-bridge arrangement 16 is lower than the LED threshold voltage (multiplied by the turn ratio of the transformer 18).

Specifically, the parallel resonant converter, including the resonant inductance (Lu1 plus LD1), has the capability of boosting up the voltage up to the LED threshold voltage. Such a boosting effect of the converter increases as the switching frequency applied by the controller 20 to the electronic switches 22a, 22b approaches the resonance frequency of the resonant arrangement.

This principle of operation is better explained by referring to the diagram of FIG. 3.

Essentially, the diagram in question portrays the behaviour of the input voltage-to-LED voltage gain G (ordinate scale) against the switching frequency f of the controller 20 (abscissa scale).

The peaked behaviour of the diagram is related to the quality factor Q of the resonant circuit, which can be designed (in known manner) in order to match the specific operation requirements of the circuit.

In general terms, if the controller switching frequency changes from a "nominal" value f1 to another value f2 which is closer to the resonance frequency fr of the resonant circuit (i.e. the peak of the diagram of FIG. 3), the gain value G is correspondingly increased from a first value G1 to a second, higher value G2.

Typical values for f1 are some tens of kHz over f2, while typical values for f2 are some tens of kHz over fr.

Consequently, the controller 20 can be operated (in a manner known per se) in order to change the frequency of drive signal applied to the electronic switches 22a, 22b during the semi-period of the alternated sine-wave input line voltage. This is done decreasing that frequency (e.g. from f1 to f2) around the zero-crossing points of the input voltage to render the frequency in question closer to the resonant frequency fr in order to boost the input voltage, while the frequency of drive signal applied to the electronic switches 22a, 22b is increased (e.g. by restoring it to f1) over the rest and around the peak of the mains voltage.

Such behaviour is schematically represented in the diagram of FIG. 4.

There, the switching signal SW applied by the controller 20 to the gates of the electronics switches 22a, 22b is portrayed on a common time scale t against a semi-period of the input voltage IW derived from the mains source Vin.

The specific law ruling the variation of the frequency of the switching signal SW over the semi-period of the input voltage IW may be adapted at will (possibly as a result of experimental tests or automatically by means of a multiplier) as a function of the resonance diagram shown in FIG. 3 and in accordance with the boosting effect desired.

The boosting mechanism previously described in connection with FIG. 3, provides for the switching frequency of the converter 20 being rendered closer to the resonance frequency fr of the resonant arrangement including to the capacitor C1, C2 by making such a switching frequency lower (i.e. by passing from the frequency f1 to the frequency f2). Those of skill in the art will promptly appreciate that a similar effect can—at least notionally—be implemented in a complementary way, namely by selectively increasing the switching frequency of the converter 20 when the boosting effect is required. By referring to the graph of FIG. 3 this alternative arrangement would require the frequency f1 to be lower than the frequency f2, and the frequency f2 to be in turn lower than the frequency fr.

While feasible, such an alternative arrangement represents at present a less-preferred solution for a number of reasons. These include i.e. the fact that the current operating frequency f1 of the controller 20 is generally selected as a relatively high frequency. Additionally, selecting a switching frequency below the resonance frequency could imply an undesired increase of power losses on the primary and secondary side.

The behaviour represented in FIG. 4 essentially represents a sort of frequency modulation of the switching frequency of the controller 20, which can be achieved by known means by using the input voltage signal IV as the modulating entity.

This mode of operation is fully compatible with operating the controller 20 as a conventional PFC (Power Factor Correction) controller including an inner mains current feedback loop to force a sinusoidal mains current shape and an outer loop to control the average LED current. For that reason the controller 20 is made sensitive to the input current (via the sensing resistor 17), the mains voltage (via the line 20a) and the transformer current measurement (via the line 21).

In the arrangement illustrated in FIG. 1, the LED current cannot be measured on the primary side of the transformer 18 because the respective current is the sum of the LED current and the resonance current.

For that reason the current intensity measurement feedback line 21 is connected at 21a on the secondary side of the transformer 18 (secondary winding 18b).

In the case of fixed output load, the outer controller loop can be removed and a simple mains voltage feedforward scheme can be added to ensure constant power feed to the LED or LEDs at different line voltages.

The arrangement illustrated in FIG. 1 exhibits a number of advantages.

It may take the form of a cheap circuit adapted to ensure a good current matching between the LED or LEDs with different values for the forward voltage Vf, by means of the capacitor of the voltage-doubler C3 and C4, without sensing a current feedback from each series of LEDs. Additionally, it can be easily implemented to fulfil standards related to harmonic generation such as the EN standard 61000-3-2 class C. Additionally, the "wobbling" mechanism of the switching frequency of the controller 20 described in connection with FIG. 4 leads to a useful spread of the electromagnetic noise generated: this spectrum spread is advantageous in terms of reducing electromagnetic interference (EMI). Moreover, the rectifier is typically placed outside with respect to the housing of the power-supply unit, i.e. on the LED module, in order to reduce the overall dimensions of the power-supply unit itself.

All of the foregoing applies also to the alternative embodiment illustrated in FIG. 2. In this alternative embodiment an extra resonant inductor L2 is arranged in parallel with the primary winding of the transformer 18. In FIG. 2 the magnetising inductance of the transformer 18 is not explicitly shown as the current flowing through it can be regarded as generally negligible in comparison with the overall primary current.

Referring to FIG. 2, typical values for the magnetising inductance Lu1 of the transformer 10 are in the range of 1-20 mH. Typical values for the leakage inductance LD1 of the transformer 10 are in the range of 0.02-1 mH while a suitable choice for L 2 is in the range of 0.2-5 mH.

In the embodiment illustrated in FIG. 2, the LED current feedback point 21a for the line 21 is arranged on the primary side of the transformer 18. The signal provided on the feedback line 21 is thus a correct measurement of the load current and can be properly used to implement current feedback/protections. Additionally, in the alternative embodiment of FIG. 2, the resonant current is primarily carried by the inductor L2 and total RMS current on the primary windings of the transformer is correspondingly reduced.

An additional inductor L4 (with a typical value in the range of 0.02-2 mH) can be further arranged in series with the parallel connection of the inductor L2 and the primary winding 18a of the transformer to possibly further reduce the resonance frequency fr of the converter.

Those of skill in the art will promptly appreciate that both embodiments illustrated in FIGS. 1 and 2 may further include additional components.

For instance a capacitor can be arranged immediately downstream of the diode bridge, in possible cooperation with standard DM and/or CM filter, in order to filter out the switching current of the half-bridge. Similarly, an additional inductor can be added in series to each cell in order to improve current matching between parallel cells.

Without prejudice to the underlying principle of the invention, the details and embodiments may vary, even significantly, with respect to what has been described and illustrated in the foregoing, by way of example only, without departing from the scope of the invention as defined by the annexed claims.

The invention claimed is:

1. A power-supply arrangement for driving at least one light-emitting diode (LED) having a threshold voltage, including:
   a transformer having a secondary winding for driving said at least one LED and a primary winding defining a transformer turn ratio,
   a half-bridge arrangement to be fed with an input voltage and coupled to said transformer,
   a resonant circuit between said half-bridge arrangement and the primary winding of said transformer, said resonant circuit having a resonance frequency, and
   a controller configured for switching said half-bridge arrangement with a switching frequency variable between at least one first value and at least one second value, wherein said second value is closer than said first value to said resonance frequency, the controller varies said switching frequency toward the second value to produce a boosting effect of the voltage fed towards said at least one LED via said transformer when said input voltage is lower than the threshold voltage of said at least one LED multiplied by the transformer turn ratio, wherein said power supply arrangement is located in a housing; said at least one LED is connected to the secondary winding of said transformer via a rectifier, wherein said rectifier is placed outside said housing.

2. The arrangement of claim 1, wherein it includes one or more series of LEDs connected to the secondary winding of said transformer, each of them via said rectifier placed outside said housing.

3. The arrangement of claim 2, wherein said at least one first value and said at least one second value are both higher than said resonance frequency, whereby said at least one second value is lower than said at least one first value.

4. The arrangement of claim 2, wherein said input voltage is an alternating voltage having zero-crossing areas, and said controller is configured for switching said half-bridge arrangement with a switching frequency with said at least one second value when said input voltage is in said zero-crossing areas.

5. The arrangement of claim 1, wherein said at least one first value and said at least one second value are both higher than said resonance frequency, whereby said at least one second value is lower than said at least one first value.

6. The arrangement of claim 5, wherein said input voltage is an alternating voltage having zero-crossing areas, and said controller is configured for switching said half-bridge arrangement with a switching frequency with said at least one second value when said input voltage is in said zero-crossing areas.

7. The arrangement of claim 1, wherein said input voltage is an alternating voltage having zero-crossing areas, and said controller is configured for switching said half-bridge arrangement with a switching frequency with said at least one second value when said input voltage is in said zero-crossing areas.

8. The arrangement of claim 7, wherein said input voltage is a sinusoidal voltage, and said controller is configured for using said input voltage as a modulating entity of said switching frequency.

9. The arrangement of claim 1, wherein said half-bridge arrangement includes at least one capacitor to create said resonant circuit together with the magnetising and leakage inductance of said transformer.

10. The arrangement of claim 1, wherein the magnetising inductance of said transformer is included in said resonant circuit to define the resonance frequency thereof.

11. The arrangement of claim 1, wherein it includes at least one additional inductor interposed between said half-bridge arrangement and the primary winding of said transformer to define the resonance frequency of said resonant circuit.

12. The arrangement of claim 11, wherein said at least one additional inductor is arranged in parallel to the primary winding of said transformer.

13. The arrangement of claim 11, wherein said at least one additional inductor is arranged in series to the primary winding of said transformer.

14. The arrangement of claim 1, wherein it includes a feedback line for feeding said controller with a feedback signal indicative of the intensity of the current fed to said at least one LED.

15. The arrangement of claim 14, wherein said feedback line is connected to the secondary winding of said transformer.

16. The arrangement of claim 14, wherein said resonant circuit includes an inductor connected in parallel with said primary winding of said transformer, and
   said feedback line is connected to the secondary winding of said transformer.

17. The arrangement of claim 1, wherein said at least one first value and said at least one second value are both higher than said resonance frequency, whereby said at least one second value is lower than said at least one first value.

18. The arrangement of claim 1, wherein said input voltage is an alternating voltage having zero-crossing areas, and said controller is configured for switching said half-bridge arrangement with a switching frequency with said at least one second value when said input voltage is in said zero-crossing areas.

19. The arrangement of claim 1, wherein said half-bridge arrangement includes at least one capacitor to create said resonant circuit together with the magnetising and leakage inductance of said transformer.

* * * * *